(No Model.)  
8 Sheets—Sheet 2.

W. BARRY.
POSTMARKING AND CANCELING MACHINE.

No. 585,075.  
Patented June 22, 1897.

Witnesses  
Geo. Bundine  
Hubert C. Peck

Inventor  
W<sup>m</sup> Barry  
per O. E. Duffy  
Attorney (No Model.) 8 Sheets—Sheet 4.

W. BARRY.
POSTMARKING AND CANCELING MACHINE.

No. 585,075. Patented June 22, 1897.

Witnesses
Geo. Bindine
Hubert E. Peck

Inventor
Wm Barry
per O. E. Duffy
Attorney (No Model.) 8 Sheets—Sheet 5.

W. BARRY.
POSTMARKING AND CANCELING MACHINE.

No. 585,075. Patented June 22, 1897.

Witnesses
C. E. Burdine
Hubert E. Beck

Inventor
Wm Barry
per O. E. Duffy
Attorney (No Model.) 8 Sheets—Sheet 6.
W. BARRY.
POSTMARKING AND CANCELING MACHINE.
No. 585,075. Patented June 22, 1897.
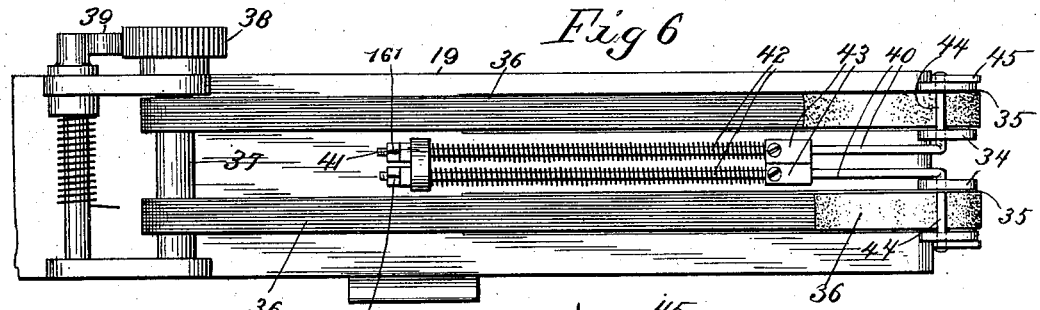
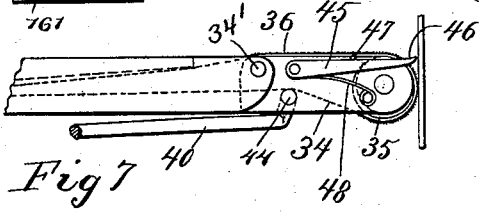
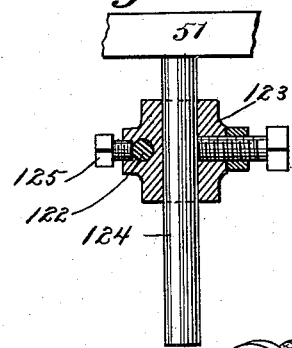
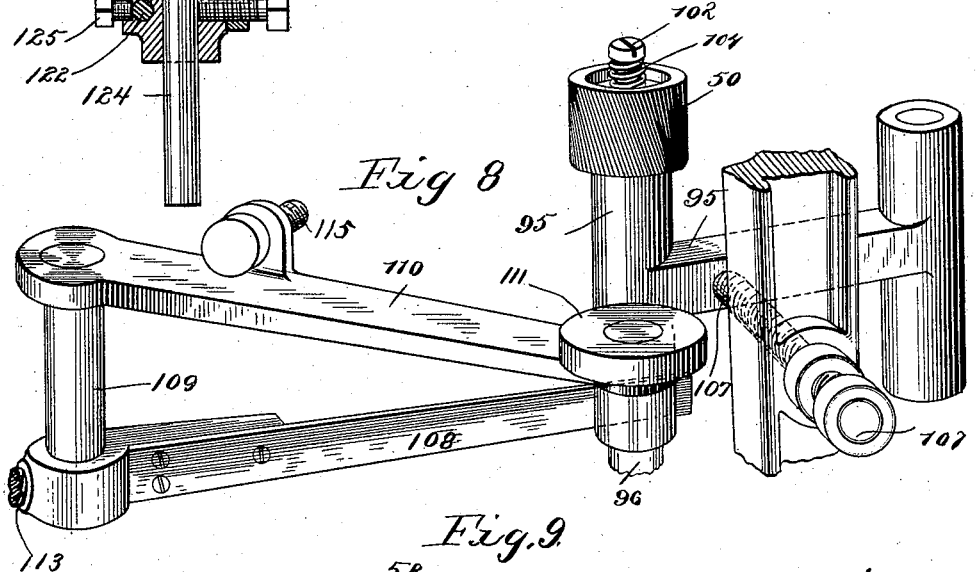
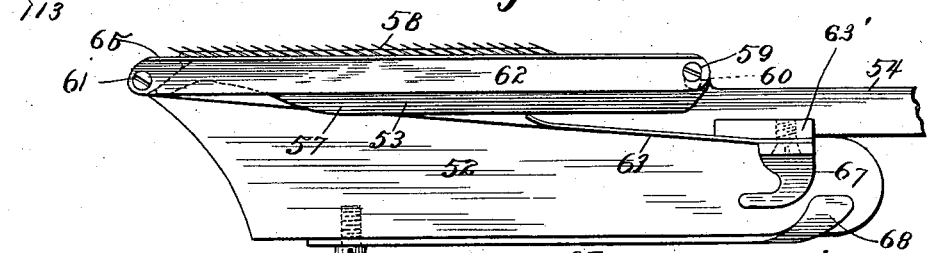
Witnesses
C. C. Burdine
Hubert Peck
Inventor
Wm Barry
per O. E. Duffy
Attorney
THE NORRIS PETERS CO., PHOTO-LITHO., WASHINGTON, D. C.

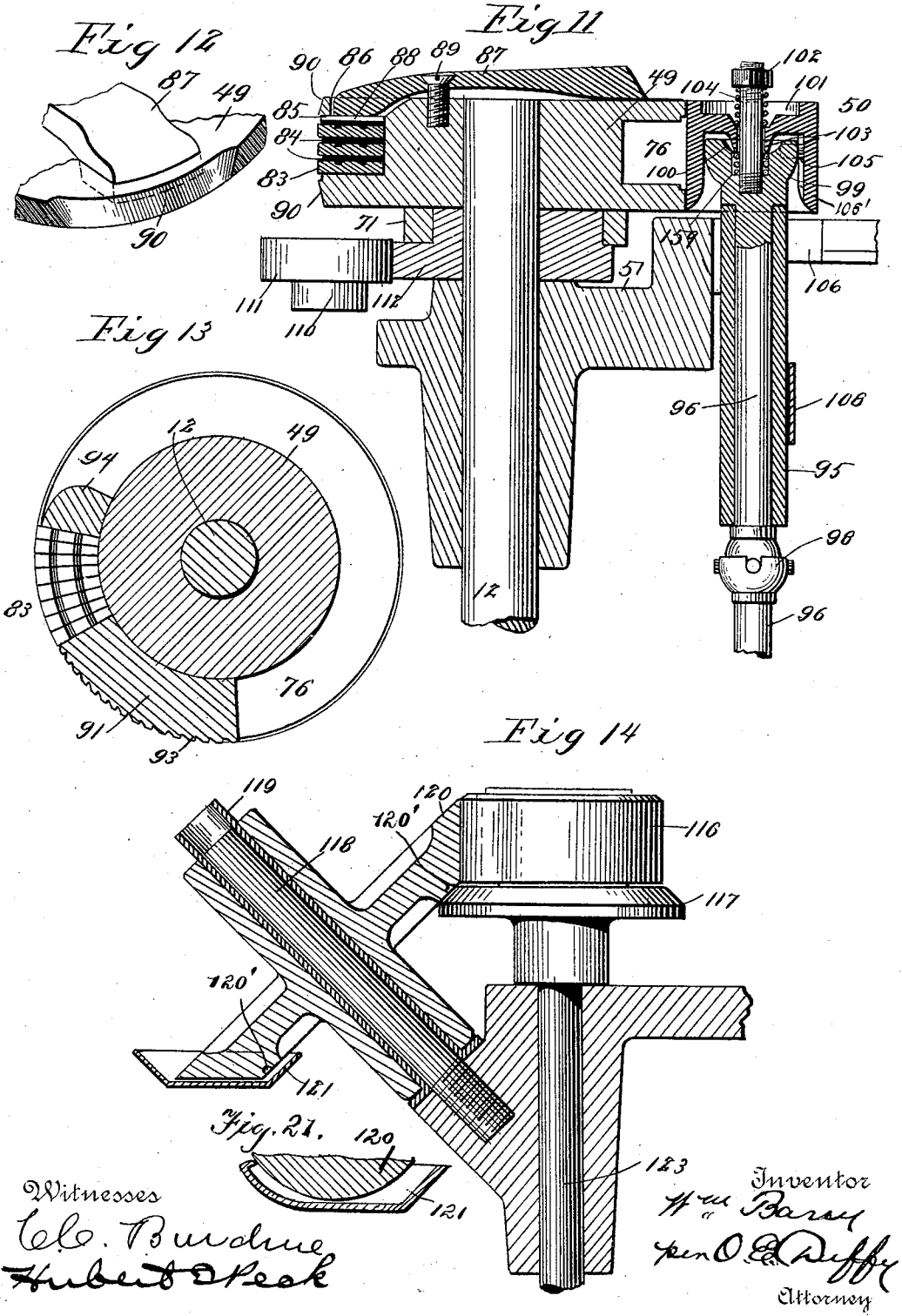

(No Model.) 8 Sheets—Sheet 8.
W. BARRY.
POSTMARKING AND CANCELING MACHINE.
No. 585,075. Patented June 22, 1897.
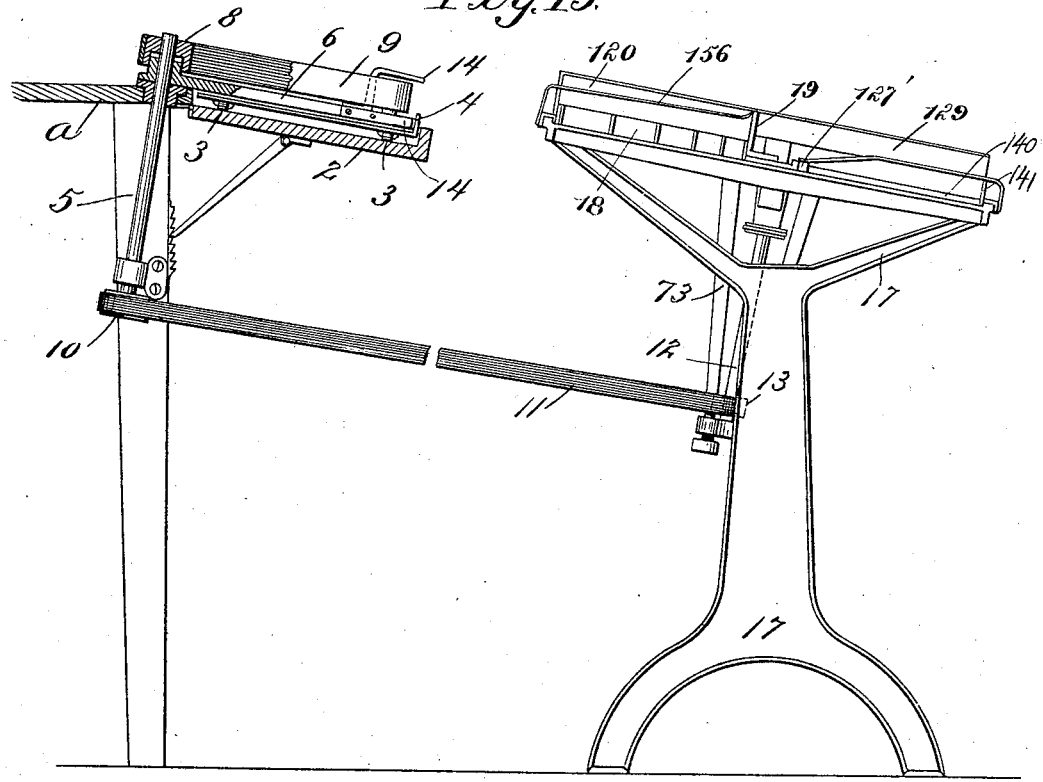
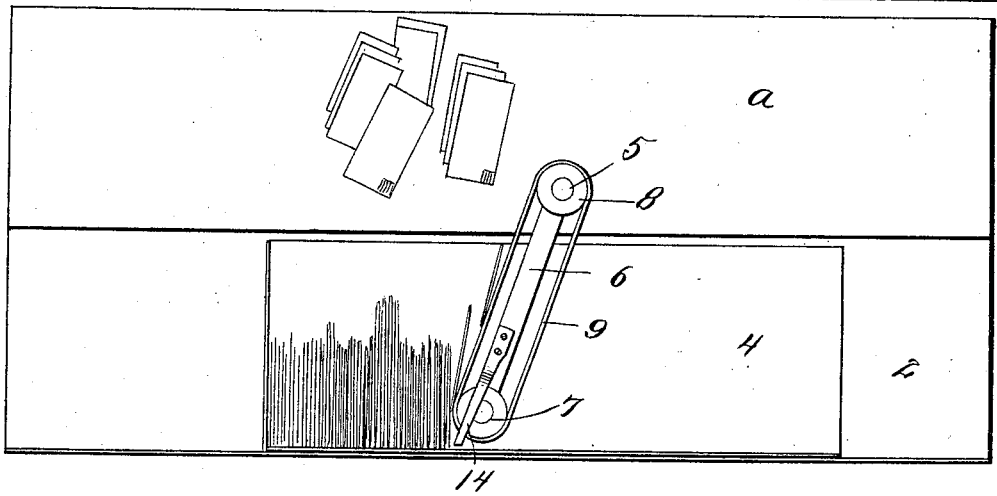
Witnesses
Inventor
Wm Barry
per O. E. Duffy
Attorney

UNITED STATES PATENT OFFICE.

WILLIAM BARRY, OF SYRACUSE, NEW YORK.

POSTMARKING AND CANCELING MACHINE.

SPECIFICATION forming part of Letters Patent No. 585,075, dated June 22, 1897.

Application filed September 12, 1893. Serial No. 485,335. (No model.)

*To all whom it may concern:*

Be it known that I, WILLIAM BARRY, of Syracuse, in the county of Onondaga and State of New York, have invented certain new and useful Improvements in Postmarking and Canceling Machines; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in postmarking and canceling machines.

The object of the invention is to provide an improved postmarking and canceling machine, sure and effective in action, and whereby letters and mail-matter of various sizes and thicknesses can be effectually postmarked and canceled.

A further object of the invention is to provide certain improvements in details of construction and arrangements of parts whereby a greatly-improved and highly-efficient postmarking and canceling machine will be provided.

A further object of the invention is to provide an improved letter or mail facing and stacking or packing device by means of which the postmarking and canceling device can be easily and quickly supplied with properly-arranged mail-matter.

The invention consists in certain novel feature of construction and in combination of parts and peculiar arrangements, more fully and particularly pointed out and described hereinafter.

Figure 1:
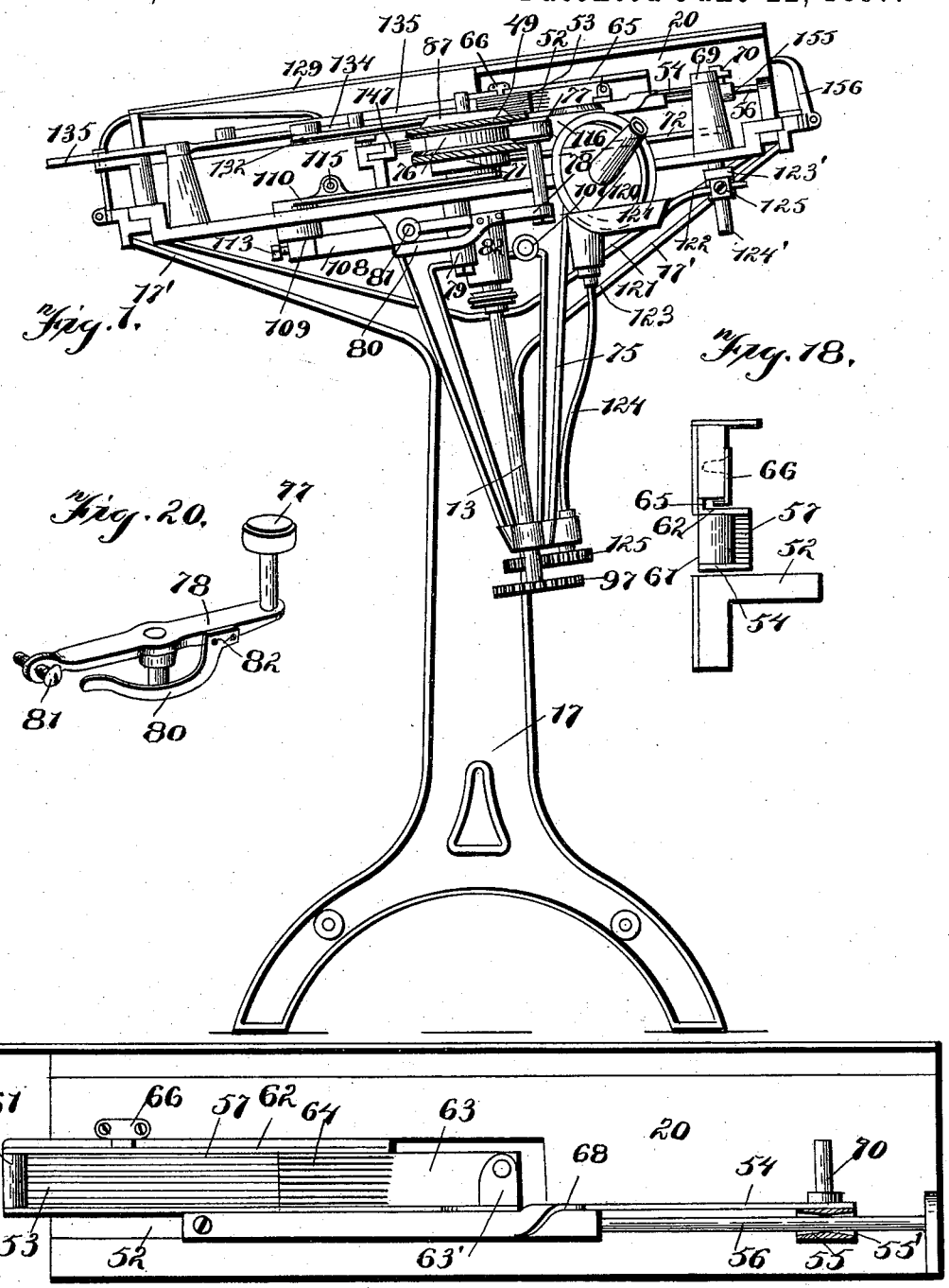
Figure 2:
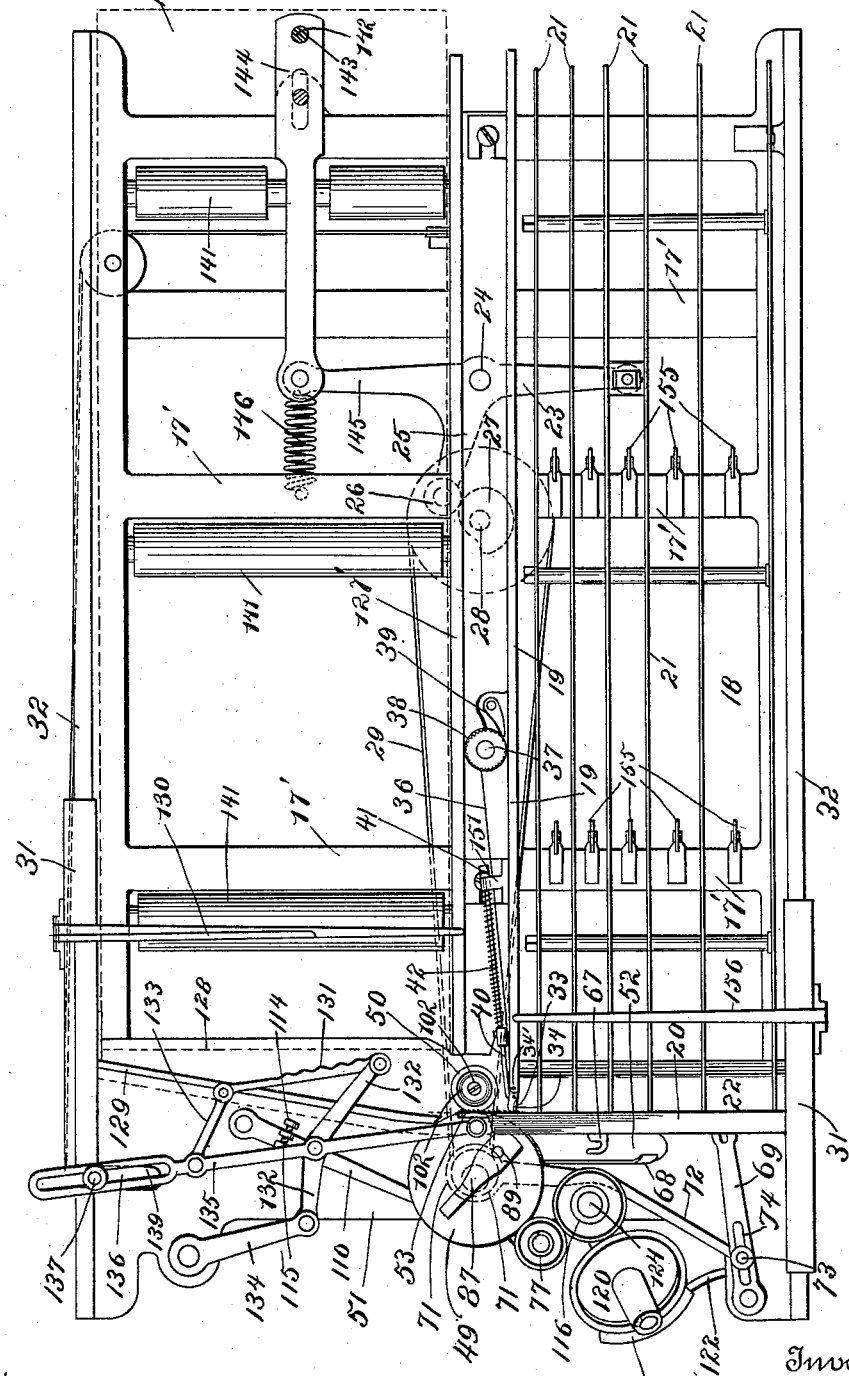
Figure 3:
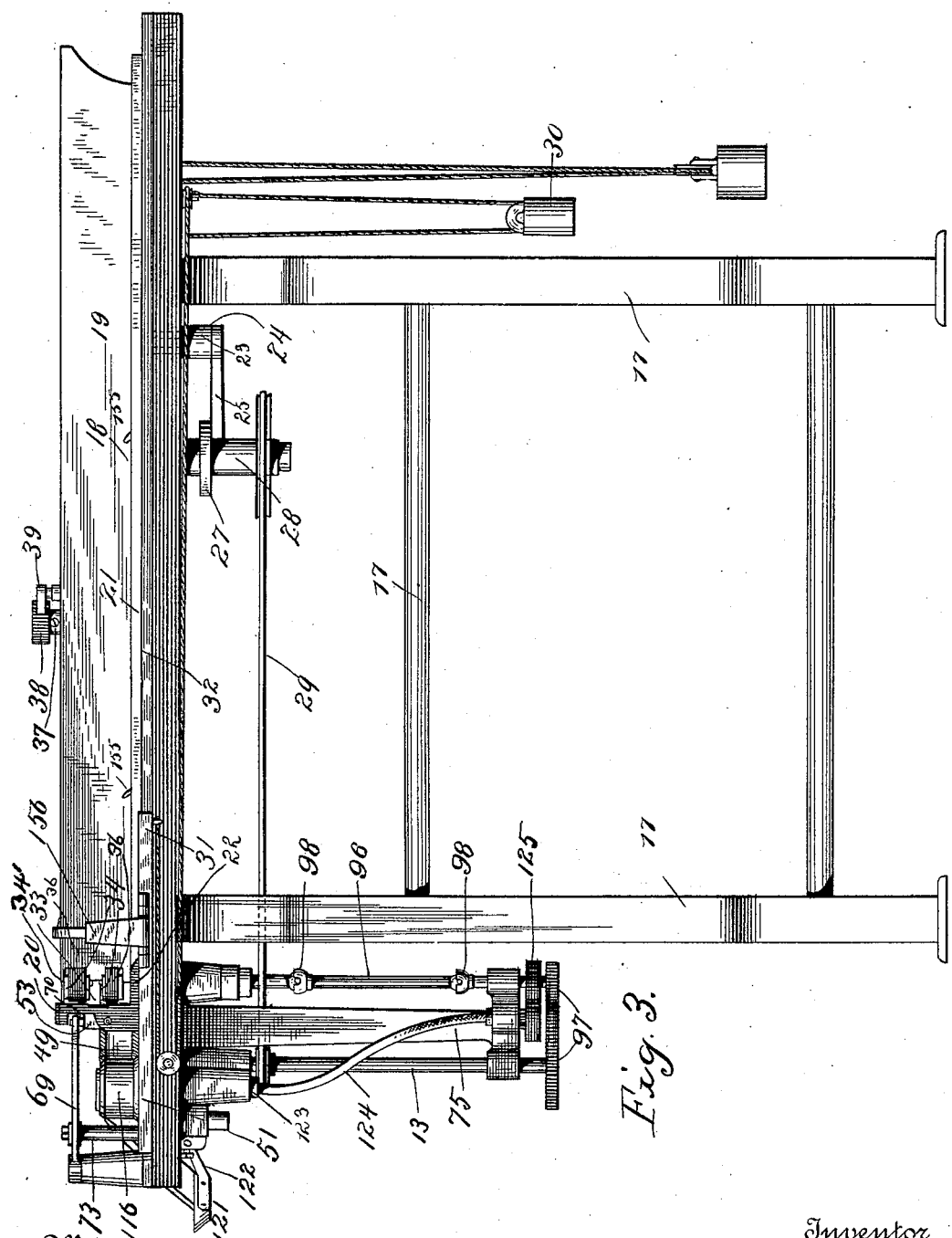
Figure 4:
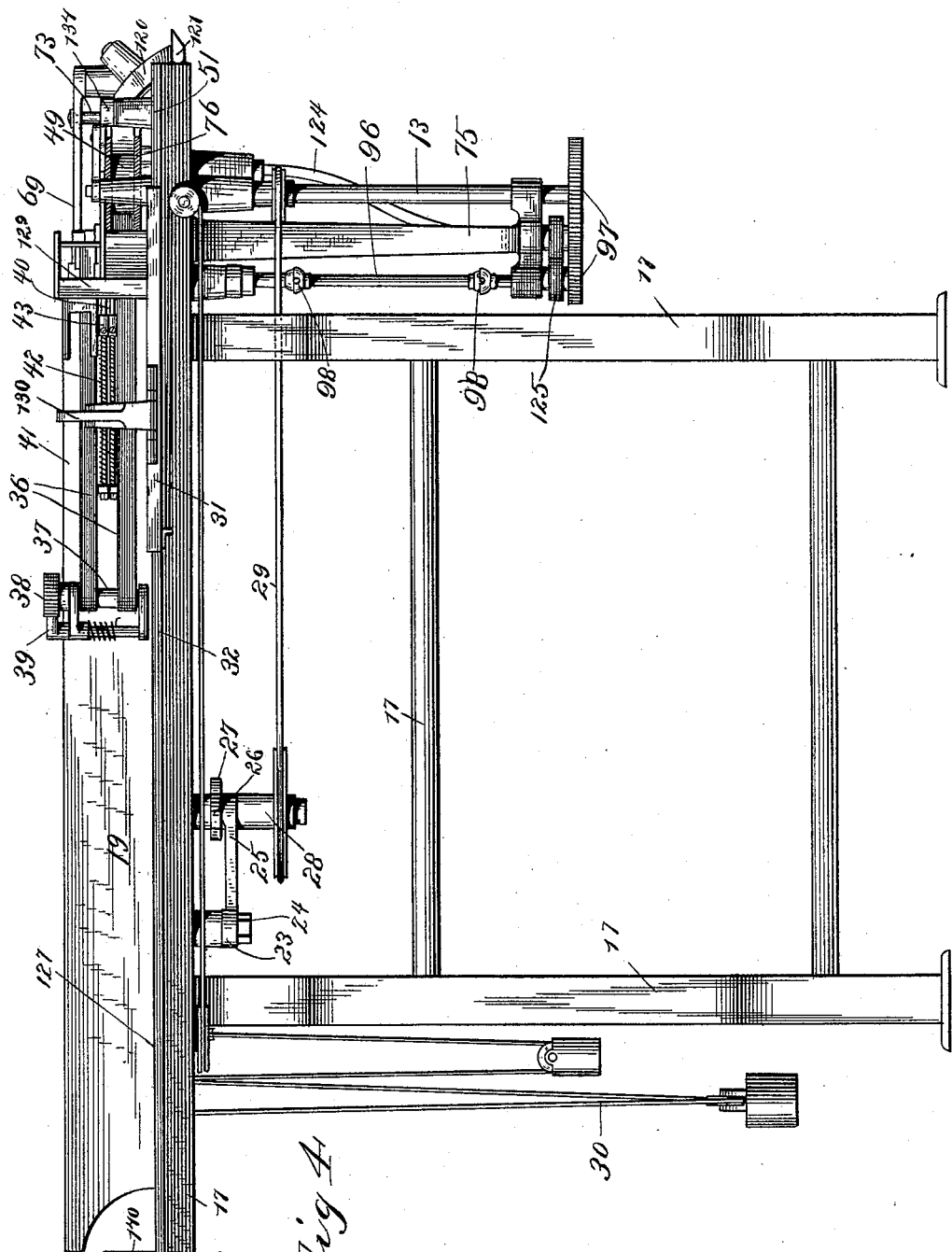
Figure 5:
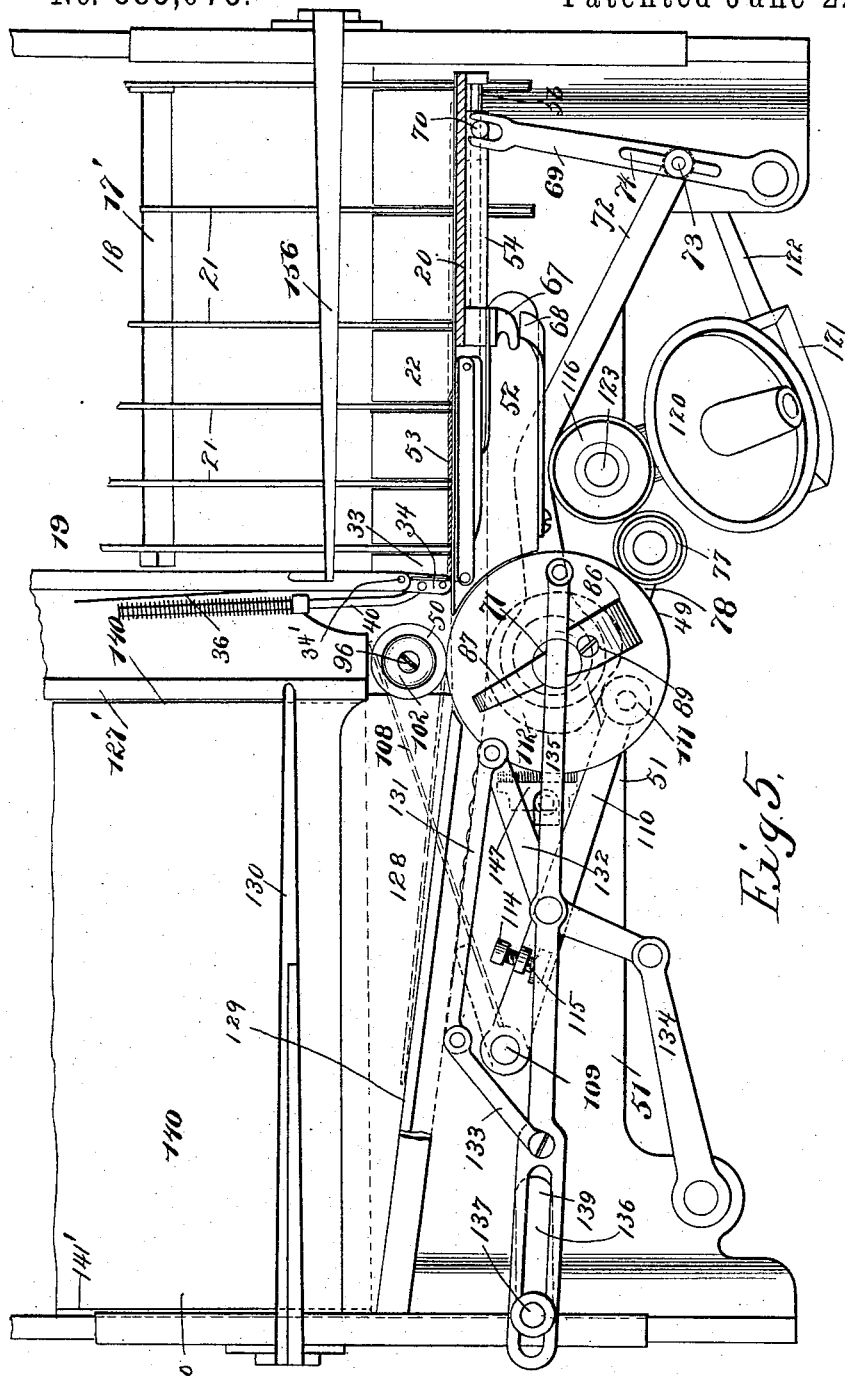

Referring to the accompanying drawings, Figure 1 is a front elevation of the improved postmarking and canceling machine. Fig. 2 is a top plan view. Figs. 3 and 4 are side elevations from opposite sides of the machine, respectively. Fig. 5 is a detail top plan view of the front portion of the machine, parts being broken away and parts being shown in dotted lines. Fig. 6 is a detail elevation of the letter-separating device located at the discharge from the letter-feedway into the letter-receiving way. Fig. 7 is an enlarged top plan view of the inner portion of the construction shown in Fig. 6. Fig. 8 is a detail perspective view showing the impression-roller and the swinging arm carrying the same, also showing the spring controlling said impression-roll and the arm controlling said spring, the cam controlling said arm not being shown, also showing the stop for limiting the inward movement of said impression-roll. Fig. 9 is a detail top plan of the reciprocating feeder and the bed-plate or floor upon which it slides. Fig. 10 is a detail edge view of said reciprocating feeder, showing the spring pressing in the separate plates or sections of said feeder. Fig. 11 is a detail vertical sectional view, partially in elevation, showing the printing-roll and its impression-roll and also showing the cam controlling the spring-tension on the impression-roll. Fig. 12 is a detail view of a portion of the printing-roll, showing how the same is beveled off above and below the printing-characters wheel. Fig. 13 is a detail horizontal section through the printing-wheel. Fig. 14 is a vertical sectional view, partially in elevation, showing the ink-feeding device. Fig. 15 is an elevation showing the machine in connection with its letter facing and stacking device. Fig. 16 is a top plan view of a letter facing and packing device forming a part of my machine and which properly faces and stacks the letter in the tray for the stamping mechanism. Fig. 17 is a detail elevation, partially in section, of the transverse feeder and the front wall of the feedway. Fig. 18 is a detail end view of the feeder. Fig. 19 is a detailed enlarged sectional view of the manner of supporting and permitting adjustment of the ink-pan. Fig. 20 is a detail perspective view of the inking-roller and its spring-controlling mechanism. Fig. 21 is a detail view showing the ink pan or reservoir scraping the ink-elevating edge of the ink-elevator roll.

In post-office practice the mail-matter is thrown on sorting-tables. The stamping-machines are preferably located near these tables, with their facing and stacking devices located at the edges of the table and driven from (preferably) the main drive-shafts of their respective stamping-machines, so that the clerks place the letters, facing in the proper direction, in the pressing device, which properly stacks them onto a tray. The tray is then transferred to the feedway of the stamping mechanism and the tray is removed, leaving the letters in said way in the proper position to be carried through the machine.

In the drawings the reference-letter $a$ (see Figs. 15 and 16) indicates a sorting-table. The outer edge of this table is provided with the downwardly-inclined elongated shelf 2, having a flange or guide at its lower outer edge. This shelf can be hinged so that it can drop, a movable brace or support being provided to uphold it. (See Fig. 15.) This shelf is provided with suitable rollers 3, on which the tray 4 is adapted to rest and slide in its inclined position on said shelf. This tray at its lower longitudinal edge and at one end has vertical walls or sides, but the opposite upper edge and the other end are open. A vertical shaft 5 is mounted near the edge of the sorting-table, so as to extend above and below the same. This shaft is mounted at a point about midway of the length of the shelf, and a rigid arm 6 extends laterally from a point at the upper end of said shaft 5 over the said shelf and a distance above the same. The inner end of said arm 6 carries a vertical pulley 7, located near the outer edge of said shelf.

The upper end of shaft 5 is provided with the pulley 8 and a belt 9, passed around said pulleys 7 and 8, and the shaft 5 is driven in such a direction that the upper side of said pulley is driven inwardly toward the outer edge of said shelf. Arm 6 and the belt 9 are inclined toward the outer end of the shelf 2, so that the letters when placed in the upright position, facing outwardly on the upper side of said belt, will be carried to the outer longitudinal edge of the tray, and the pile of letters will be properly packed and the letters properly alined against the edge of the tray.

14 are fingers projecting from the end of the arm 6 above and below the feed-belt and pulley 7 to prevent the letters moving around with the belt between the edge of the tray and the same.

In operation the emptied tray is placed on the shelf 2 with its closed end against the upper side of the lower end of the belt, the tray extending beneath the belt. The operator then places the letters, facing in the same direction, on the tray against the belt, which carries them down into the tray and tightly packs them therein together, the tray at the same time being constantly pushed or fed toward the outer end of the shelf. The operators are thus relieved from all bother or trouble of packing and pushing forward the pile of letters as they are sorted, they having merely to place the letters on the belt in the proper position, and are enabled to use both hands in thus sorting the letters in the tray, thus greatly facilitating the operation.

The shaft 5 is preferably driven from the printing-wheel shaft 12 of the stamping-machine, located close to the sorting-table, by means of the belt 11 and pulleys 10 and 13, and the shafts 5 and 12 are both inclined and parallel with each other.

Referring to the stamping-machine, 17 indicates the upright supporting-frame, having at its upper ends the laterally-extending arms 17', that support the feed and receiving ways for the letters.

The letter-feedway 18 extends horizontally and longitudinally of the machine, and at its inner longitudinal edge is provided with a vertical guide-wall 19. The inner end of the feedway is closed by a vertical wall 20. The floor of the feedway is composed of the longitudinal rods 21 at their front ends, extending into slots in the cross-bar 22 at the front end of the way.

The longitudinal rods 21 slide on cross-bars of the frame and are rigidly secured together to move simultaneously by suitable cross-rods. They are reciprocated longitudinally by means of a rocking lever 23, fulcrumed at 24 to the frame beneath the ways of the machine and at one end pivotally joined to the reciprocating floor, comprising said bars 21 and having an arm 25 extending laterally from the pivotal point 24 and provided with a friction-wheel 26, held yieldingly, engaging cam 27, rigid on the vertical sleeve 28, suitably mounted to rotate on a stud depending from the frame. This sleeve 28 is driven from the printing-wheel shaft 13 by means of the belt 29 and pulleys, substantially as shown. The cam 27 is provided with a periphery having a gradually-increased curvature ending in an abrupt shoulder, so that as the cam rotates the said floor, composed of rods 21, will be reciprocated gradually toward the inner end of said way, so as to carry the letters forward against the closed inner end of the way. When the wheel 26 reaches the abrupt ending of the curve of the cam, the floor of the way will be quickly moved in the opposite direction, so as to slip back under the lower edges of the letters without carrying them back. The floor is thus quickly returned by means of a spring to be hereinafter described.

The feedway can have movable holding-fingers 155 projecting up through the reciprocating floor thereof and inclined toward the front end of the way, so that the letters can slide forwardly over the same, but will be held thereby against retrograde movement. However, the invention of this application is not limited to the employment of these fingers. Also, the invention herein disclosed is not limited to the peculiar construction or form of any reciprocating feedway herein described.

A suitable follower 156 is provided to loosely hold the letters in their upright position and loosely together in the feedway. This follower is yieldingly pressed toward the inner end of the feedway by means of a suitable counterweight mechanism 30. The follower consists of an elongated block 31, sliding and confined on the longitudinal way 32 at the edge of the letter-way, and an arm at its lower or outer end hinged to said sliding block and extending upwardly therefrom transversely over the letter-way, with its free end resting on the guide 19. The follower is hinged so that it can be swung laterally from the feedway and permit insertion of the tray with the pile of letters.

33 indicates the lateral discharge-opening from the feedway to the printing mechanism. This opening is formed by the wall 19, ending a short distance from the end wall 20, leaving the narrow discharge-opening. This opening is normally closed by the separating-fingers 34, suitably hinged or pivotally joined at their inner ends to the front end of the wall 19 and extending across the discharge-opening, so as to engage and yieldingly press against the wall 20 and swing outwardly to permit the passage of one letter at a time, but press back all letters beind the one being pushed through. Each finger (see Fig. 6) preferably consists of a block 34 or the like having a vertical roller 35, journaled at its outer end. Each finger, carrier, holder, or block 34 is pivoted or fulcrumed at 34' to a support, as wall 19, to permit the proper swing of the fingers. A strip 36 of suitable flexible friction material, preferably emery-cloth, passes around the roller 35 of each finger, so as to form a projecting friction-surface which engages the wall 20 and the surfaces of the letters, thereby materially assisting in holding back the letters. Each strip of emery-cloth extends from a vertical spool or windlass shaft 37, mounted in suitable bearings carried by the wall 19. This shaft on its upper end carries the ratchet-wheel 38, and a spring-actuated pawl 39 engages said ratchet-wheel and normally holds the same against rotation. The strips of emery-cloth extend from said windlass horizontally along the side of the wall 19 and along the inner faces of the fingers 34 and around the pulleys 35 and then back a suitable distance, so that as the emery-cloth at the extremities of the fingers wear by rotating the windlass-shaft these strips will be wound thereon and fresh surfaces will be moved to the extremities of the fingers, the worn emery-cloth gradually winding up on the windlass-shaft, and whenever desired fresh strips can be substituted for those worn. These separating-fingers are yieldingly pressed inwardly against the wall 20 by means of the rods 40, extending along the face of the wall 19 through a suitable guide 41, extending laterally from wall 19, so that the rods extend at an inclination from the rear side of the fingers.

Each rod is provided with a coil-spring 42, compressed between the guide 41 and the adjustable stop 43. The stops 43 of the two fingers preferably rest on each other, so as to steady the rods and retain their bent ends in the fingers. The inner ends of the rods extend inwardly between the two fingers 34 and have lateral ends 44, extending up and down, respectively, loosely through their respective fingers, as clearly shown in Fig. 6. These bent ends 44 also serve to hold the free ends of the emery strips in position, as clearly shown.

It should be observed that the fingers of the separator are located a distance apart to permit the reciprocating feeder, as hereinafter described, to move past the separator without engaging the same should the parts operate without an interposed letter.

45 indicates a finger pivoted at its outer end on the block 34 and extending to the wall 20 and having its inner end 46 curved forwardly toward the feedway, as clearly shown in Fig. 7. This finger is yieldingly held against a stop 47 by means of a spring 48. One or more of these supplemental fingers 45 can be employed, as they have been found to be exceedingly effective in holding back letters behind the letters being operated upon, the hooked ends 46 of the supplemental fingers catching under the edge of the letter and holding it back. These supplemental fingers are particularly effective in holding back very thin letters, as the sharp hooked ends are very reliable in performing the function just described.

The term "hooked" has been here employed as apt for describing the free end of the finger 45, but the invention is by no means limited to such shape, as other forms can be employed to provide an edge or shoulder to press along the rear face of the letter moving past the separator, and thus engage the ends of the letter or letters in the rear and separate and hold it from the letter being moved to the printer. The rods 40 are provided with the adjustable stops 161 on their ends to limit the inward swing of the separating-fingers. The printing mechanism of the machine is located outside of said separating mechanism just described.

The printing mechanism comprises the horizontal rotating printing-roll 49 and the small horizontal rotating impression-roll 50. The printing-roll is located above the floor 51 at the front of the machine and in front of the wall 20 and projects inwardly through said wall, so that the inner side of its periphery extends into or across the path of the letters in the discharge throat or opening 33. The upper surface of the printing-wheel is preferably located in a plane below the opening or space between the separating-fingers.

53 indicates the transversely-reciprocating feeder that carries the letters separately from the feedway through the separating device into the printing mechanism. This feeder 53 slides on an elevated floor or bed 52, so that the feeder moves in a plane above the printing-wheel and can reciprocate over and beyond the same between the separating-fingers.

54 indicates a slide-plate at one end having a sleeve 55 (see Fig. 17) loosely embracing the horizontally-arranged guide-rod 56, so as to permit the free end of the plate carrying the biting-surface to move in and out.

It will be observed that the inner or free end of the sliding carrier 54 carries the letter-biting surface, while the outer end of such carrier is guided or confined in such a manner as to permit a play of said free end toward and away from the letter-feedway. The drawings show this guiding means comprising a sleeve on a guide-rod and having an oppositely-tapered bore 55'.

The feeder proper, 53, can be composed of the plurality of horizontally-arranged and independently-movable plates 57. The inner edge of each plate forms a biting-surface 58, composed of the plurality of closely-arranged needle-points, all inclined toward the discharge 33 of the feedway. These plates are loosely confined to the carrier 54, so as to slide in and out and have independent movement by means of a screw or pin 59 passed down through elongated transverse slots 60 in the ends of the plates 57. These slots are preferably located at one end only of the series of plates, while the in-and-out swinging of the free ends thereof is limited by the stop 61. This stop is held by a screw, and said screw and the screw 59 pass down through the plate 62, above said plates 57, into the sliding plate 54. A plate-spring 63 is suitably secured to the sliding plate 54 and is provided with a plurality of spring-fingers 64, respectively engaging the rear edges of the sections of the feeder 53, so as to yieldingly press the sections of the feeder toward the letters in the feedway. The spring 63 is preferably secured to an upright post or projection 63' from and rigid with the carrier-plate.

The plate 62 is provided with a vertical flange 65 along its inner edge, and a lip 66 (see Figs. 17 and 18) extends down from the wall 20 at the outer edge of said flange to limit the outward swing of the plate 54, carrying the feeder. The plate 54 is also provided at a point preferably in rear of the feeder 53 with a curved or rounded shoulder, projection, or nose 67, arranged to engage the stiff spring 68, secured to the floor 52, to force or yieldingly press the free end of the feeder inwardly to the letters at the beginning of the stroke of the feeder toward the discharge from the feedway. This nose 67 and engaging spring 68 tend to force the end of the feeder-block in to engage and grip the end of the letter at the beginning of each feeding stroke.

By reason of the peculiar construction just described the free end or nose of the feeder is driven in at the beginning of a stroke to engage the front or inner end of each letter, so as to pull the letters through the separating means into the printing mechanism. By this means tearing or doubling up of the letters is avoided, as is the case where letters are grasped at their centers or intermediate portions and pushed through a resistance.

Advantages are also attained by having the stroke of the feeder extending to a point to or beyond the printing mechanism, whereby the letters are effectually and positively carried forward; also, by these means very thin letters can be operated upon as easily as thick stiff letters or mail-matter; also, great advantages are attained by the peculiar form of biting-surface employed, formed of a plurality of very sharp closely-arranged points, as the letter is most firmly grasped without tearing or injuring the surface of the envelop or without perforating the same; also, advantages are attained by having the biting-surface composed of independently-movable sections, because an extended surface of the envelop will be grasped even though the letters be uneven and of various sizes throughout, and, furthermore, all the needles will be brought into play even though the surface of the letter be very uneven; also, this form of feeder will prevent injury to bulky articles in the envelop, and the sections of the feeder can be easily removed should the needle-points become injured or broken.

It should be observed that the wall 20 is provided with the longitudinal slot extending beyond the printing-wheel to receive the feeder. (See Fig. 5.)

The reciprocating feeder is operated by eccentric 71, located on the printing-roll shaft and having its strap provided with a pitman 72, loosely joined to a stud 73, carried by a horizontal swinging lever 69, fulcrumed at its outer end and having its inner forked end loosely embracing a pin 70, extending up from the rear or outer end of the slide-plate 54. The swinging lever 69 is provided with a longitudinal slot 74, so that the stud 73 can be adjusted longitudinally of said lever and vary the throw of the lever.

The lower end of the printing-roll shaft 13 is mounted in a bearing in the lower portion of the hanger 75, depending from the front portion of the frame of the machine, and the upper end of said shaft is mounted in the upper front portion of the machine. This printing-roll shaft preferably constitutes the driving-shaft of the machine, and any suitable power can be coupled thereto.

The printing-roll is rigidly secured on the upper end of this shaft and is provided with the circumferential groove 76 to receive the printing-type and the stamp-canceler, and more particularly to receive the ink-distributing roller 77, so that the edges of said printing-roll that engage the letters will not come in contact with said ink-distributing roller, said roller 77 being of the same or less width than the width of said groove and depression 76.

The ink-distributing roller can be of any suitable construction, such as a soft composition-roller. This roller 77 is carried by a vertical stud from the laterally-swinging arm 78, pivoted on a pin or stud 79 and provided with a spring 80, secured to the arm and bearing against the frame to yieldingly hold the roller 77 toward the printing-roll. A screw 82 is provided to regulate the tension of said spring. The extended end of the arm 78 is provided with a screw 81, arranged to engage the frame and limit the swinging of said arm.

The type 83 are preferably arranged in horizontal parallel lines within the said groove of the printing-roll. The type can be provided with grooves in their side faces, as shown in Fig. 11.

The horizontal rows of type are separated by interposing packing material 84, such as strips of leather or the like. Thus when the type are clamped together the strips of packing are forced into said grooves, thereby holding the type in position, whereby also various sizes of type can be held. The type-roll is provided with an opening 86 into the groove down through the top above the type. Clamp 87 is provided to removably secure the type in said groove. Said clamp is so curved that its outer end rests on the upper portion of the type-roll on one side thereof, while the opposite end extends down through the opening 86 on the opposite side of the printing-roll. A screw 89 extends loosely through said clamp and enters the type-roll, so that the clamp can be tightened or loosened, as desired, by means of said screw. A plate 88 is interposed between the end of the clamp 87 and the type. By means of this peculiar construction the clamp can be easily and quickly loosened, so that the type can be exchanged or removed very easily.

91 indicates a block removably secured in the groove of the type-wheel by any suitable means, such as a screw. This block is located at the front end of the series of type, and at its front edge is provided with a series of vertical printing-ribs 93, which form the stamp canceler or "killer." These ribs 93 are formed sharp on their front longitudinal edges, as shown in Fig. 13, so as to assist in feeding the letters forward. 94 is a stop in the groove of the type-roll against which the type rest. This block or stamp-canceler is formed so as to be removable independently of the type, so that it can be removed from the machine when it is desired to print or mark mail-matter without employing the stamp-canceler or when it is desired to employ the "received" stamp. Above and below the type the edges of the type-roll are beveled or cut away, (see 90,) so that the type will project beyond all portions of the printing-roll at that point, so that the said edges will not in any way interfere with the type striking the letter and completely and perfectly performing the printing operation.

The edges of the type-roll and the surface of the impression-roll 50 are "knurled" or provided with very fine approximately vertical serrations, whereby the surfaces of said rolls grasp the letters and greatly assist in feeding the same.

The impression-roll 50 is carried by the shaft 96, at its upper portion journaled in the swinging arm 95, so mounted in the under portion of the frame as to move the impression-roll toward and from the printing-roll. The lower portion of said impression-roll shaft is journaled in the hanger 75 and is geared to and revolved by the printing-roll shaft by means of gearing 97.

The impression-roll shaft is provided with two or more universal or ball joints 98 between its bearing in the hanger and swinging arm 95 to permit lateral swing of the upper end of said shaft with the impression-roll.

The upper end of the impression-roll shaft is enlarged and provided with the rounded lower surface 99, and the flat upper end of the shaft is provided with a central rounded depression 100. The impression-roll is formed hollow, with a transverse web 101 above the center thereof, centrally perforated and having a central downwardly-projecting hub 103 resting and rocking in said rounded depression 100, so that the roll can readily rock from its center to maintain the impression and printing rolls parallel, where the letters have parallel faces, no matter what the position of the impression-roll, and particularly so that the impression-roll can always adjust itself to the surface of uneven letters, but primarily to permit the roll to freely yield to uneven letters to always present a firm impression-surface. 102 indicates a screw passing through said web 101 into the upper end of the shaft and surrounded by a coil-spring 104, yieldingly holding the roll in its normal position. The shaft is provided with a radial outwardly-projecting pin 105, entering a vertical slot 105' in the inner surface of the roll, to turn the roll with the shaft and permit vertical lifting or removal of the roll from the shaft when the confining-screw is removed.

159 indicates a spring in the shaft pressing up on the roll against spring 104, so as to balance the roll and render it very responsive and quick in rocking action.

The bracket of arm 95 swings in the slot 106 in the frame. This slot limits the outward movement of the impression-roll.

The inward swing of the bracket 95, carrying the impression-roll, is limited by a suitable adjustable stop, such as a screw 107, (see Figs. 1 and 8,) passing in through a portion of the frame of the machine, so that the head of the screw is preferably located at the front of the machine, so as to be easy of access. By means of this construction the inward swing of the impression-roller can be adjusted to a nicety. This is a feature of importance, as it enables the impression-roll to be held normally just out of contact with the type-roll, and yet so close thereto that said rolls will catch and carry along the thinnest letters or postal cards. As the impression-roll is thus held from contact with the type-roll, no ink will collect on the surface of the impression-roll to smear or ink the rear faces of the envelops or mail-matter should the rolls be rotated without mail-matter passing between them.

A suitable spring is provided to yieldingly hold the impression-roll toward the type-roll. This spring is preferably in the form of a plate or bow spring 108, at its free end bearing against the inner side of the arm or bracket 95. The opposite end of said spring is adjustably secured to the short vertical shaft 109 by means of a set-screw 113. This short shaft is journaled in and extends through the front floor 51 of the machine and above the said floor is provided with a lateral arm 110, having the roller 111, yieldingly held against the cam 112, rigid with the upper portion of the front-roll shaft. The cam 112 is so formed as to rock the arm 110 and spring 108 in such a way as to relieve the tension of the spring on the impression-roll at the time the letter is about to enter the printing mechanism. This intermittent relieving or partially relieving the tension of the spring on the impression-roll at each forward stroke of the reciprocating feeder as the letter is about to enter the printing mechanism is a feature of importance, as it permits the rolls to readily separate and receive each letter, thereby avoiding bending or jamming of the letters and permitting them to enter easily and quickly between said rolls. It should also be noted that this positive mechanism for controlling the pressure of the impression-roll toward the printing-roll increases the pressure on the impression-roll when the printing-characters of the printing-roll are passing the printing-point and impressing the letter, so that the increased pressure insures a good printed impression on the letter.

115 is a screw carried by the arm 110 and arranged to engage the stop 114 on the front edge of the machine, so as to limit the inward swing of the arm, if desired, and thereby control the degree of relief imparted to the spring 108 intermittingly.

116 indicates a soft inking-roller in engagement with the distributing-roller 77, arranged to convey the ink thereto and driven by a shaft 123, having a flexible section 124, journaled in the lower portion of the hanger 75 and suitably geared to the impression-roll shaft by gearings 125, so that the said ink-distributing roller is rotated from the impression-roll shaft preferably.

121 is a horizontally-arranged ink receptacle or reservoir. Suitable means are provided to convey the ink from the horizontal ink-receptacle to the vertical ink-distributing roll 116. The ink-receptacle preferably consists of a pan 21, open at the top and supported by an arm 122, adjustably and removably secured to the depending stud 124'. The arm 122 is preferably a spring-arm, which is adjustably secured by means of screw 125 to the support 123' and on the pin 124, the support 123 being vertically adjustable on the support 124. The pan can thus be vertically, laterally, and horizontally adjusted.

The ink-elevator means preferably consists of an inclined rotary disk or wheel 120, having a suitable hub mounted on the inclined pin 118, extending upwardly and outwardly from the front portion of the machine between the roll 116 and the pan 121. This wheel or disk has an inclined or beveled edge at the upper portion parallel with and engaging the periphery of the soft roller 116 and at the lower portion entering the pan 121 and preferably parallel with the bottom thereof, so that the said inclined edge enters the ink in the pan and the ink adheres thereto and is elevated to the surfaces of the soft roller 116. This inclined ink-conveyer 120 is driven by the friction-disk 117, such as a leather disk, having a beveled edge and rigidly secured on the shaft 123 and a distance below the roller 116, so that the ink will not get on the disk. The beveled edge of the friction-disk 117 engages the inner surface of the wheel 120 and thereby rotates said wheel. The inner surface of said wheel 120 is provided with depressions 120' at the bottom of the beveled edge to prevent ink getting on the driving friction-surfaces of the wheel 120 and the disk 117. The end of the pan is so formed as to scrape off the surplus ink from the beveled edge of the ink-conveyer. The spring 122 yieldingly holds the ink-pan up against the conveying-wheel 120.

The receiving-way preferably extends rearwardly from the front end of the machine parallel with and close beside the feedway and at its front end has the stationary cross-piece 128 and along the inner longitudinal edge has the low guide 127'. (Shown clearly in Figs. 2, 5, and 15.)

The wall 129 extends across the inner end of the receiving-way in continuation of the wall 20, extending across the feedway, and is inclined toward the outer end of the receiving-way, as clearly shown. Thus the letters discharged into said receiving-way are carried toward the outer end thereof by said inclined wall, so as to leave ample space for the entrance of the next succeeding letter.

The front wall of the receiving-way is so arranged transversely of the receiving-way that the letters from the printing mechanism thrown against said wall have their outer ends directed toward the rear end of the way, so that their inner ends will be more readily engaged by the stacker and pressed toward the outer longitudinal edge of the way and thus leave ample space for the next succeeding letter.

The receiving-way is provided with a follower 130, as in the feedway, provided with a counterweighted mechanism yieldingly pressing it toward the inner end of the receiving-way, so as to hold the letters in the proper upright position. This follower is constructed the same as that in the feedway.

Suitable means are provided to engage each letter as it enters the way and press the same into position and assist in moving out the pile of letters in the receiving-way.

Referring to the stacker or presser, 135 indicates a horizontally-swinging lever extending transversely across the end of the machine and at one end eccentrically pivoted on the type-roll and at its opposite end fulcrumed at or near one edge of the frame, so that the lever extends transversely of the length of the receiving-way beyond the end thereof. The outer end of the lever has the elongated slot 136 and is confined on the headed stud 137, adjustable in the slot 139 in the front table or floor 51 of the machine to vary the lateral throw of the lever. 131 indicates the horizontally-movable pusher-bar or letter-engaging portion of the stacker, arranged to move in and out through a horizontal slot or opening in the wall 129 to engage the letters and press the same forward to stack the letters in the proper position and assist in pressing the pile of letters outwardly. The bar can be, if desired, corrugated or formed irregular at its inner edge to catch the rear or back end or edge of each letter and move the letter to the outer edge of the way, and thus properly aline the letters in the way. The outer end of said pusher-bar is loosely joined to the lever 135 at a point near the outer end thereof by means of a link 133, pivoted to the outer portion of the pusher-bar and to said lever preferably near the inner end of the slot 136.

The inner end of the pusher-bar is pivoted to the outer end of an elbow-lever 132. At its elbow or bend this lever 132 is pivoted to the lever 135 between the type-roll and link 133. The end or arm of the elbow-lever is fulcrumed to the free end of a link 134, and at its opposite end is pivoted to the outer portion of the frame. The arrangement of the controlling means of said pusher is such that when the parts are in the position shown in Fig. 5 and a letter has been discharged into the receiving-way the inner end of the lever 135 is swung inwardly, thereby moving the inner end of the pusher in at the inner corner of the receiving-way behind the letter, so that the inner end of the letter rests in a depression on said pusher, and as the lever 135 is at the same time moving longitudinally and outwardly said pusher moves toward the outer longitudinal edge of the receiving-way and pushes the letters into the proper place behind the pile to the outer alining-guide of the way. During this movement the pusher is gradually moving into the way, so as to press the letters in the way together and assist in feeding the pile of letters outwardly until the presser reaches the position shown in Fig. 2. The inner end of the lever 135 then starts to swing outwardly, gradually withdrawing the pusher from the receiving-way until the lever 135 reaches a position diametrically opposite that shown in Fig. 5, when the pusher is outside of the end wall of the receiving-way and starts on its return movement out of contact with the letters, as shown in Fig. 5. Thus it will be observed that the pusher moves on a forward stroke into the way and toward the outer longitudinal edges thereof, but on its return stroke it moves back in a path located outside of the way, so as not to disturb the letters therein, thereby pressing each letter forwardly and outwardly as it enters the way out of the path of the next succeeding letter, so as to always keep a path open for the free entrance of the letters from the printing mechanism.

It should be noted that in the construction specifically shown in the drawings as one form of stacking device embodying my invention the outer end of the presser-bar does not move entirely through the front wall of the receiving-way during any portion of the stroke of said bar; also, that the letter-engaging portion (the presser-bar) is so controlled and actuated that as it enters the receiving-way it lies approximately parallel with the letter and engages approximately the entire flat face of the letter, and thus as it moves inwardly it pushes the letter toward the outer end of the way and gradually assumes an inclined position and in a measure engages the inner end of the letter and moves toward the outer edge of the way, thereby first pressing the letter toward the pack of letters in the way, and then moves the letter toward the outer side guide of the way, at the same time feeding the pack of letters outwardly and alining the letter.

The stacker or pusher moves in an approximately elliptical path, the inner end thereof preferably having a greater throw than the outer end to move behind and catch the end of the letter to move the same, as described.

It might be said that the stacking device herein set forth has a movable fulcrum by the rocking and sliding of the lever 135 on the bolt or pin 137, which lever indirectly carries and operates the pusher bar or portion 131 and which in turn is indirectly controlled by the lever 134 to impart the tilting and in-and-out throw of the pusher-bar.

The receiving-way preferably consists of a removable tray 140, sliding in suitable guides and resting on the transverse rollers 141, suitably journaled in the frame of the machine. The front edge of the tray extends loosely beneath the cross bar or floor 128 at the front end of the receiving-way and on which the letters slide when discharged from the printing mechanism. The cross-floor 128 prevents retrograde movement of the letters in the receiving-way, for when the letters are pushed from said floor out to the tray by the pusher or stacker the overhanging or projecting edge of said floor holds the letters against moving back toward the front end of the said way.

The tray is provided, preferably, with the longitudinal side guide 141' along its outer longitudinal edge. The tray is removably located on the machine by suitable means, such as a pin 142, adapted to enter the aperture 143 in the end of the sliding bar 144, longitudinally located beneath the receiving-way and pivotally joined to the arm 145 of the three-arm horizontally-rocking lever 23.

The spring 146 is attached to the bar and yieldingly holds the same at its limit of movement in one direction. By this means the receiving-way is reciprocated longitudinally with the feedway; but the gradual feeding movement is toward the outer end of the way in the opposite direction to that of the feedway. The letters in the receiving-way are thus fed toward the outer end thereof, and the returning-spring 146, acting on the three-armed lever, quickly returns both the feed and the receiving ways at the completion of each feeding stroke.

When the tray has been filled with letters, it can be easily lifted from the machine and the letters removed therefrom. To remove the tray, it is merely necessary to raise the rear end thereof, so as to disengage the pin 142. Any suitable removable brush 147 can be employed to engage the periphery of the type-roll to engage the type and keep them clean.

The operation of the machine is obvious. The letters are maintained loosely in their upright position in the feedway and are fed forward, so that they can be easily grasped separately by the feeder and carried through the separating device into the printing mechanism, which discharges them into the inner end of the receiving-way, wherein each letter is pressed forward by the stacker or presser and the pile of letters in the receiving-way is constantly fed forward by the reciprocating floor.

The arms of the main frame carrying the letter-ways are so arranged as to hold said ways laterally inclined, as shown, so that the letters are held against the inner side guide of the feedway and the outer side guide of the receiving-way.

It is evident that various changes might be made in the forms, arrangements, and constructions of parts described without departing from the spirit and scope of my invention. Hence I do not wish to limit myself to the construction herein set forth, but consider myself entitled to all such changes as fall within the spirit and scope of my invention.

Having thus fully described my invention, I claim as new and desire to secure by Letters Patent of the United States—

1. A sorting-table provided with an inclined shelf, a removable letter-tray, and mechanism to pack the letters in the tray, substantially as described.

2. A mail-sorting table provided with a shelf having a support at one edge thereof, the letter-packing mechanism arranged on said shelf to aline the letters and force the pack of faced letters longitudinally of the shelf, substantially as described.

3. A sorting-table provided with a letter-tray, a shelf at one edge raised to support the letter-tray, and means, substantially as described, to carry the letters to the outer edge of said tray and to pack and maintain them in the upright position.

4. A sorting-table provided with a shelf at one edge thereof, an arm extending over said shelf carrying a traveling belt to engage the letters, and means for operating said belt, substantially as described.

5. The sorting-table formed at one edge to removably receive a letter-tray, a letter-tray, and letter-pressing means to pack the letters in the tray and move the tray along as the letters are packed therein, substantially as described.

6. A mail-marking machine having the feed and receiving ways provided with reciprocating floors, a horizontal swinging lever connected to said floors to reciprocate the same, and means, substantially as described, to control said lever.

7. A mail-marking machine, having its feed and receiving letter ways provided with reciprocating floors, a horizontally-arranged lever pivotally joined to both of the floors, a spring yieldingly holding the lever in one direction, and a cam operating on said lever to swing the same, substantially as described.

8. In a mail-marking machine, the combination of a frame, the parallel letter feed and receiving ways having reciprocating floors, a lever to reciprocate said floors, a horizontal cam beneath the ways controlling said lever and rigid with a pulley, a printing mechanism interposed between said ways, and a pulley on the printing-roll shaft connected by a belt to the first-mentioned pulley, substantially as described.

9. In a mail-marking machine, the combination of a frame, letter-ways having reciprocating floors, a horizontally-swinging multi-armed lever connected with and reciprocating the floors, and means for rocking said lever, substantially as described.

10. A mail-marking machine having a letter-tray, a sliding bar directly and removably engaging said tray to reciprocate the same, and means for reciprocating said bar, substantially as described.

11. A mail-marking machine provided with a stationary supporting-frame, horizontal rollers, a reciprocating bar confined in said frame and provided with an aperture, and means to reciprocate said bar in one direction, a spring acting on said bar, and a letter-tray resting on said rollers and having a pin to enter the said opening of the bar, substantially as described.

12. In a mail-marking machine, the combination of a frame, a letter-way having a front wall and a side discharge, a printing mechanism at the discharge comprising rotating rolls, a reciprocating feeder at said wall arranged to engage each letter near its inner end and having a path of movement beside an end of one of said rolls, said frame being extended forwardly from said wall, a lever arranged in front of said wall and at its outer end fulcrumed to the frame and from thence extending inwardly toward and at its free end pivotally connected to the feeder, and a connection in front of the wall, eccentrically connected to and operated by a shaft of said rolls and at its opposite end pivoted to said lever at an intermediate point thereof, substantially as described.

13. In a mail-marking machine, the combination of a frame, a horizontally-disposed letter-way having a slotted end wall and a discharge-opening from one edge of the way behind said wall, a frame-table extending in front of said wall, a printing-roll arranged above the table on its shaft, a guideway in front of said wall, a reciprocating feeder thereon, a lever at its outer end fulcrumed on said table and extending inwardly with its free end loosely confined to said feeder, and a pitman above said table pivoted to the lever in longitudinal adjustment thereof, and eccentrically connected with said shaft, substantially as described.

14. In a mail-marking machine, the combination of a frame, two horizontally-disposed letter-ways arranged side by side and having the opposite side openings through which the letters pass from one way and into the other way, feeding means, the printing-couple arranged between the ways and said openings, a slot in the frame between said ways, a horizontal arm arranged beneath the plane of said ways and at its outer end pivoted to said frame, the free end of the arm arranged beneath said slot, a vertical shaft mounted in the free end of the arm and carrying one member of said printing-couple, a plate-spring pressing against the free end of the arm to yieldingly hold said members of the couple together, the outer end of the slot limiting the separating movement of said members of the couple, substantially as described.

15. In a mail-marking machine, the combination of a feedway, a receiving-way, a frame, a letter-passage from one way to the other, a printing-couple in said passage, said frame having an opening at the printing-couple, a horizontally-disposed arm arranged beneath the plane of said opening and disposed transverse the length of the ways and at one end pivoted to the frame with its free end at said opening, a vertical shaft in the free end of said arm carrying one member of said couple, a spring bearing on the free end of the arm, and a stop to limit the outward swing of the arm tending to separate the members of the printing-couple, substantially as described.

16. In a mail-marking machine, a frame, a horizontally-disposed receiving-way having a letter-receiving opening, a printing-couple arranged at said opening, a slot in the frame at said opening, a horizontal arm arranged beneath the plane of and transversely disposed to the length of said way, and pivoted to the arm at one end with a bearing at its free end extended up into said slot, a vertical shaft in the bearing carrying at its upper end a member of the printing-couple, and a plate-spring at one end confined to the frame and at its opposite end bearing on the free end of said arm, substantially as described.

17. In a mail-marking machine, the combination of a frame, letter-ways having a discharge from one to the other, feeding mechanism, a printing-roll arranged at said discharge, the frame having an opening opposite the printing-roll, a horizontally-disposed swinging arm arranged beneath the frame with its free end beneath said opening and swingable toward and from the printing-roll, a vertical shaft mounted in said free end of the arm, an impression-roll on the upper end of said shaft, a spring acting on said arm to hold the impression-roll toward the printing-roll, and positively-operated mechanism at fixed periods varying the tension of said spring on said arm, substantially as described.

18. In a mail-marking machine, the combination of a printing-roll, an impression-roll having a movable support, a spring constantly holding the impression-roll toward the printing-roll, a pivoted support for said spring having a rigid arm, a rotary part against which said arm is held by the spring so that the tension of the spring on the impression-roll is varied at fixed periods, substantially as described.

19. In a mail-marking machine, the combination of a printing-roll, a horizontal swinging arm, a shaft carried thereby, an impression-roll carried by the shaft, a spring engaging said arm to press the impression-roll toward the printing-roll, and positively-operated mechanism controlled by a moving part of the machine and directly controlling said spring to vary the tension thereof on the arm at each and every rotation of the printing-roll, substantially as described.

20. In a mail-marking machine, the combination of a printing-roll, a movable carrier, a shaft and impression-roll carried thereby, a spring yieldingly holding the impression-roll in its constantly-operative position, a rockable support for said spring, and positively-actuated means rocking said support at fixed periods to increase the tension of the spring on the impression-roll at every revolution of the printing-roll and as the type thereof are presented to the impression-roll, substantially as described.

21. In a mail-marking machine, the combination of a printing-roll, a movable impression-roll constantly held in operative position, a plate-spring yieldingly holding the impression-roll toward the printing-roll, and a rockable support for the spring provided with positively-operated means controlled by a rotary portion of the machine to rock said support and vary the tension of the spring on the impression-roll at fixed and predetermined periods independent of mail-matter, substantially as described.

22. The combination of the type-roll shaft and the type-roll rigid thereon, the impression-roll shaft, geared to the type-roll shaft, an impression-roll loose on the upper end of its shaft, a spring-controlled swinging arm in which the upper portion of said impression-roll shaft is journaled, said impression-roll shaft being flexible between its lower bearing and said arm, substantially as described.

23. The combination of a type-roll, its movable impression-roll, a spring yieldingly forcing the same toward the type-roll, a rotary cam, and a swinging arm controlled by said cam and controlling said spring to intermittingly vary the pressure of said spring on the impression-roll for the purpose set forth.

24. The combination of a type-roll and its shaft, an impression-roll movable toward said type-roll, a plate or leaf spring pressing said impression-roll toward the type-roll, a vertical shaft carrying said spring and provided with a swinging controlling-arm, and means, substantially as described, controlling said arm to swing the same to intermittingly vary the pressure of said spring on said impression-roll.

25. In combination, a type-roll and its shaft having a cam, an impression-roll on a swinging arm, a shaft carrying a spring, a lateral arm from said shaft controlled by said cam, and an adjustable stop for said arm arranged to operate for the purpose described.

26. The combination with a shaft having a shoulder, the shaft of less diameter beneath the shoulder, a roll having an intermediate internal stop or support resting and rockable on the shoulder, and a spring yieldingly holding the roll so that it can rock vertically on and independently of the shaft, substantially as described.

27. In a mail-marking machine, the combination, of a printing-roll, a shaft, a round concentric hard impression-surface carried by and loosely confined to said shaft to coact with the printing-roll, and a yielding or spring device interposed between the shaft and said surface and normally holding and maintaining the surface parallel with the printing-roll, and yet permitting vertical rocking or yielding of said surface independently of its shaft, substantially as described.

28. A mail-marking machine having a vertically-rockable impression-roll, the laterally-swingable shaft for said roll, the roll yieldingly held in its normal vertical position on the upper end of its shaft by means of springs, substantially as described.

29. The impression-roll shaft, having the enlarged end and lateral pin and central top depression, in combination with the hollow roll having the vertical internal groove to receive said pin, the internal web with the central hub resting in said depression so that the roll can rock from about its center, and the screw passing through said hub into the shaft and having a spring bearing down on the roll, substantially as described.

30. The impression-roll shaft having the enlarged rounded end with a rounded top depression, in combination with the hollow impression-roll loose thereon having the internal web with the downwardly-projecting hub resting in said depression so that the roll is free to rock on said shaft end, and means confining the roll on the shaft causing it to rotate therewith, substantially as described.

31. In a mail-marking machine, a shaft, an extension projecting upwardly therefrom, a roll mounted loosely on the upper end of said shaft to rock laterally thereon, a spring exerting upward tension on the roll, and another spring exerting downward tension on the roll, substantially as described.

32. In a mail-marking machine, the combination of a shaft, an impression-roll loosely mounted thereon, two springs acting in opposition on said roll so that the roll will rock readily, substantially as described.

33. In a mail-marking machine, the combination of a printing-roll having a circumferential groove and the letter-engaging edges above and below the groove, said edges knurled or serrated, printing-characters in a portion of the groove, said edges beveled away above and below the printing-characters, an inker arranged to project into the groove to engage the printing-characters only, an impression-roll, of greater length than the width of said printing-roll groove, and having a ribbed feeding-surface, and a swinging and yielding arm holding said impression-roll toward the printing-roll, substantially as described.

34. In a mail-marking machine, the combination of a printing-roll having a circumferential groove and the edges above and below the groove, the lower edge forming a letter engaging and feeding surface, printing-type in a portion of the groove, the roll having a top opening down into the groove above the type, a type-holding clamp extending through said opening, a shaft carrying the roll and extending beneath the frame, an inker-roll arranged opposite the groove to engage only the printing-characters therein, a swinging arm yieldingly held toward the printing-roll, a shaft therein and extending beneath the same and geared to the printing-roll shaft, a yieldingly-held impression-roll on said last-mentioned shaft having a feeding and impression surface greater in length than the width of said printing-groove, substantially as described.

35. The type-roll having a recess, removable printing-characters therein, said roll having an opening through its end into said recess, and a clamp-lever resting on said end of the roll and extending down through said recess to clamp the type therein and having tightening means entering the roll eccentrically thereof, substantially as described.

36. A type-roll having an edge recess opening through an end of the roll, removable type in said recess beneath the opening, and a clamp-lever arranged at said end of the roll and at one end formed to removably rest on the roll on one side of the axis and from thence to extend over the roll to the opposite side of the axis with its opposite end formed to fit in and pass down through said top opening to clamp and hold the type, and a clamping-screw passing down through the lever into the roll, substantially as described.

37. In a mail-marking machine, the combination of feed and receiving ways, having feeding means, a printing-couple interposed between said ways, a bed or floor on which the letters travel from one way to the other through the couple, the impression-roll of the couple having a round concentric impression-surface yielding independently of its shaft, and the printing-roll having a circumferential depression intermediate its ends, removable type in a portion of said depression opposite an intermediate portion of the impression-surface, a clamp on the upper end of the printing-roll extending through an opening to clamp the type, the edge of the printing-roll below the depression rough to form a feeding-surface coacting with the lower portion of the impression-roll, substantially as described.

38. In a separating device, the combination of a guide along which the pieces of mail-matter pass, a yielding finger extending across the path traversed by the pieces of mail-matter and toward said guide and having its end or face toward the advancing pieces rounded or curved to hold or force said pieces against the guide, and a yieldingly-held finger extending across said path and toward said guide and formed with an end stop or edge, so that said finger will be swung back by each piece and said end stop will engage the end edges of the pieces behind the one being fed, substantially as described.

39. In a mail-marking machine, the combination of a letter-way having a discharge, a guide along said discharge, a vertical series of horizontal fingers pivoted at their outer ends with the inner ends extending transversely across the discharge toward said guide, springs yieldingly holding the fingers across the discharge and toward said way, certain fingers having wide rounded or curved ends, and another finger having a narrow end edge arranged to engage each letter and to catch the ends of and hold back the letters behind the one being fed, and a feeder, substantially as described.

40. In a mail-marking machine, the combination of a letter-way wherein pieces of mail-matter of varying thicknesses are arranged, said way having a discharge, a feeder to carry the separate pieces through the discharge, a guide on one side of the discharge, a swinging finger extending across the discharge having its rounded free end yieldingly held to the guide and toward the letter-way to press the letters against the guide, and a swinging pivoted finger extending across the discharge and having its free end yieldingly held to the guide and toward the letter-way and formed with an edge to rub along the rear face of each letter passing through the discharge and to catch the ends of letters behind the one being fed, substantially as described.

41. In a mail-marking machine, the combination of a letter-way having a discharge, a guide at one side of the discharge, a feeder to carry the letters through the discharge, a yielding finger having a rounded end held extending across the discharge and normally against the guide, and a swinging finger pivoted at one end and extending transversely across the way with an edge at its free end to bear against the rear face of each letter forced through the discharge, and a spring yieldingly holding said swinging finger inwardly toward the way, substantially as described.

42. In a mail-marking machine, the combination of a letter-way having a discharge, a guide at one side of the discharge, a yielding finger extending completely across the discharge to said guide and having a rounded free end to engage each piece of mail-matter, and a pivoted swinging spring-held stop extending completely across the discharge and having its free end formed with an edge to engage each letter passed through the discharge, and a feeder having a biting-surface arranged to grasp each letter by its end and pull the same through the discharge and swing back the fingers, substantially as described.

43. In a separating device, a yieldingly-held separating-finger, and an auxiliary separating-finger pivoted thereto, substantially as described.

44. In a mail-marking machine, a separating device comprising a swingable yieldingly-held block provided with an adjustable strip of friction material passed loosely around the free end of the same, substantially as described.

45. In a mail-marking machine, a separating-finger pivoted at one end and extending across the discharge-opening from the feed-way, means yieldingly holding said finger, and a strip of friction material extending around the finger and provided with adjusting means, substantially as described.

46. A mail-marking machine having a pivoted yieldingly-held separating-finger having a roller in its outer end, a strip of friction material extending along said finger and around said roller, and a spool for adjusting said strip on the finger, substantially as described.

47. In a mail-marking machine, the combination of the letter-way having a side wall terminating at a lateral discharge from said way, a separating-finger pivoted at the front edge of said wall to extend across said discharge, and provided with a spring yieldingly holding it, a spool with a pawl and ratchet and located at the side wall, and a strip of friction material passed around said finger to form its engaging surface and attached to said spool so that the strip can be moved on the finger, substantially as described.

48. In a mail-marking machine, the separating device comprising the fingers pivoted to the side wall, inclined sliding rods pivotally joined to the rear sides of said fingers and having adjustable springs thereon, and extending through guides projecting outwardly from said wall, the spool having a pawl-and-ratchet mechanism and mounted beside said wall, and a friction-strip wound on said spool and extending around said fingers.

49. A reciprocating feeder comprising a sliding carrier having lateral play, means for reciprocating the same, and a feeder proper carried by said carrier and composed of a plurality of independently-movable plates carrying biting edges, means for limiting the play of said plates, and the divided spring independently pressing the plates inwardly, substantially as described.

50. In combination, the frame having a floor at one end, a horizontal guide-rod, a sliding plate at its free end resting on said floor and at its opposite end confined on said rod, a biting-surface carried by the free end of said plate, and means to reciprocate said plate, substantially as described.

51. A feeder comprising a carrier-plate, a series of horizontally-arranged independently-movable plates having a biting-surface, said plates at one end having an elongated slot, a confining-screw passed down through the same, and the stop at the exterior of said movable plates and rigid with said carrier-plate limiting the inplay of the free ends of said plates, substantially as described.

52. The feeder comprising a sliding and laterally-swinging plate carrying the biting-surface, an upwardly-extending flange at the free end of the feeder, a stop at the outer face of said flange to limit the outward swing of the plate, and a guide to throw the free end of the plate inwardly at the beginning of the stroke, substantially as described.

53. A reciprocating feeder comprising the sliding and laterally-movable plate carrying the biting-surface and provided with a curved guide at its free end, a spring-stop arranged at the back of said guide to throw the free end of the feeder inwardly at the beginning of its stroke, substantially as described.

54. A feeder comprising a reciprocating laterally-movable carrier, a biting feeding-surface carried thereby, and means which forces the carrier in and the surface against the letters at the beginning of the stroke only and leaves the carrier free to play laterally during the remainder of its stroke, substantially as described.

55. In a mail-marking machine, the combination of a letter-way, a reciprocating feeder to separately feed the letters from said way and having lateral play, actuating mechanism, and a surface disconnected from and supported independently of the feeder and arranged to engage and press the feeder laterally during a portion of its stroke, substantially as described.

56. In a mail-marking machine, the combination of a letter-way, a reciprocating feeder to carry the letters from the way having a lateral play toward and from the letters in the way, actuating means, and a stop or guiding device supported independently of the feeder and arranged to engage the feeder during a portion of each stroke and press it in toward the letters in the way, substantially as described.

57. The combination of a support, a rotary ink-elevator, a vertically-adjustable carrier, an ink-pan, and a spring from said carrier supporting the pan and holding it yieldingly against the elevator, substantially as described.

58. In an ink-distributing device, the combination of an ink-reservoir, an inclined ink-elevating wheel having the beveled ink-adhering surface, and a friction driving-surface, an ink-distributing roll engaging the ink-adhering surface, and a friction driving-disk engaging the friction-surface of said wheel, substantially as described.

59. In combination, a frame having a rigid post, a vertically-adjustable clamp thereon provided with a transverse opening, having clamping means, an ink-pan having an arm adjustable in said opening, and an ink-elevating wheel extending into said pan and carried by the frame, substantially as described.

60. In a mail-marking machine, an inking mechanism comprising the horizontally-arranged ink-reservoir, the vertical ink-distributing roller, and the inclined beveled roller for conveying the ink from said reservoir to said roller, substantially as described.

61. The combination of the vertical ink-distributing roller, a horizontal ink-pan, and an inclined ink-elevating roller entering said pan and engaging the periphery of said roller, substantially as described.

62. An inking device, comprising an ink-reservoir, a vertical ink-distributing roll, and the inclined ink-elevating roller having the beveled edge arranged to engage the periphery of the vertical ink-distributing roller and to enter the ink-reservoir, substantially as described.

63. In an inking device, the horizontal ink-pan opened at the top and yieldingly pressed upwardly, an inclined ink-elevating wheel having the inwardly-beveled edge entering said pan, and a vertical roll engaging said beveled edge and rotating said wheel, said pan bearing up against said wheel, substantially as described.

64. In combination, a frame, a shaft carrying the vertical ink-distributing roll and a beveled friction-disk separated therefrom, an ink-pan open at the top, an inclined stud extending outwardly between the pan and said roll, and an ink-elevating disk on said stud having the beveled surface engaging said roll and entering said pan so as to convey the ink from the horizontal to a vertical plane, said friction-disk engaging the inner surface of said wheel, substantially as described.

65. In combination, the printing-roll having the depending shaft, the impression-roll having the depending shaft geared to the printing-roll shaft, ink-distributing rollers for the printing-roll, a shaft geared to the impression-roll shaft and having a flexible section and carrying the ink-distributing roll at its upper end, ink-elevating means for said roll, said last-mentioned shaft having means for actuating said ink-elevating means, substantially as described.

66. In a mail-marking machine, the combination of letter-ways, a printing-roll and its shaft, a movable impression-roll having a spring holding it toward the printing-roll, a feeder to carry the pieces of mail-matter to the printing mechanism, a stacker to catch the pieces of mail-matter discharged from the printing mechanism, a swinging connection from the printing-roll to actuate the stacker, an eccentric-actuating connection from the shaft beneath the roll to the feeder, and a cam on the shaft beneath the roll controlling the tension of said spring, substantially as described.

67. In a mail-marking machine, the combination of a frame, a printing-roll shaft, feeding and receiving ways having reciprocating feeding-floors driven from said printing-roll shaft, an inking device actuated from the printing-roll shaft, and means for packing and stacking the letters in the receiving-way and actuated from the printing-roll shaft, substantially as described.

68. In a mail-marking machine, the combination of a frame, having a receiving-way with a horizontally-slotted end wall, the frame extending forwardly in front of said wall and a swinging stacker mounted on and above the frame in front of said wall and provided with operating and controlling means confining the pusher portion of the stacker to move into the way through the inner portion of the wall, and toward the outer side and end of the way, and return over the frame and in front of the wall, substantially as described.

69. In a mail-marking machine, the combination of a frame, a horizontally-disposed receiving-way having a front wall, said frame extending forwardly in front of said wall, and a horizontally-swinging stacker arranged above said portion of the frame in front of said wall and having its letter-engaging portion arranged to move into and out of the way through the wall in a fixed elliptical path, and provided with operating and controlling means, substantially as described.

70. A receiving-way having a side inlet, a pair of rolls at said inlet discharging each letter into and transversely across the floor of the way, in combination with a horizontally-movable pusher-bar having an encircling or continuous path of movement entering the front of said way near said inlet to engage each letter after it has entered the way, and extending into and transverse the way and leaving the same near the opposite side of its front with a return stroke in front of the way, and actuating means, substantially as described.

71. A receiving-way onto the floor of which the letters are discharged in an upright position, and a front wall for said way horizontally and longitudinally slotted, in combination with a horizontal pusher-bar moving into the way, horizontally and above the floor thereof, through one end of the slot to engage the last letter discharged into the way, and into and across the way in an inclined position and out of the way through the opposite portion of said slot with a return movement in front of the way so that said bar engages the letters only while in the way, and actuating means controlling and moving the bar, substantially as described.

72. In a mail-marking machine, the combination of a feeder, a printing-couple, a horizontally-disposed receiving-way into which the printing-couple discharges the letters, and a horizontally-disposed presser-bar movable into the way above the floor thereof and generally disposed transverse the way, said bar entering the way at or near the letter-entrance thereto and moving into and transversely the way with a return stroke in front of the way, said bar actuated from the printing-couple and timed with the feeder to enter the way after each letter has been discharged thereinto, substantially as described.

73. A receiving-way, in combination with a pusher-bar movable into the way above the floor thereof with a return stroke in front of the way, one end of the bar having a greater stroke than the other end to engage the letters only while in the way and to move them transverse of the way, and actuating and controlling means, substantially as described.

74. A stacker device comprising a swinging lever, and a pusher or letter-engaging portion carried by and connected with the said lever and movable independently thereof, and actuating and controlling means, substantially as described.

75. A stacker device comprising a member movable toward and from and transversely of the plane of the receiving-way, and a letter-engaging or pusher portion actuated by said member and loosely connected with the same to move independently thereof, and actuating and controlling means, in combination with a receiving-way, substantially as described.

76. A receiving-way, in combination with a stacking device comprising a movable actuating member having crank or eccentric driving means, and a movable letter-engaging portion or pusher movable in the way with a return stroke outside of the way and loosely connected with said member, and controlling means, substantially as described.

77. In a mail-marking machine, the combination of feed and receiving ways having front end walls, printing mechanism interposed between the front ends of said ways and comprising a shaft actuating the printing-roll, a reciprocating feeder in front of the feedway, a lever operating the same and connected with and actuated from said shaft, a horizontally-swinging stacking device arranged in front of and moving into and out of the front end of the receiving-way and connected with and actuated from said shaft, substantially as described.

78. In a mail-marking machine, a receiving-way, in combination with a stacking device having operating means and comprising a swinging lever having a movable fulcrum, a pusher-bar loosely connected with said lever, and means connected with said bar to vary the angle of inclination thereof in relation to the lever at different points in its stroke, substantially as described.

79. A stacking mechanism comprising a swinging lever having a movable fulcrum, crank or eccentric actuating means applied to the opposite portion thereof, and a letter-engaging portion or pusher carried by the lever between said fulcrum and its actuating means, substantially as described.

80. In a mail-marking machine, the combination of a frame, a receiving-way having a front wall, a horizontally-rotating printing-roll arranged beside said way, a horizontally-movable stacker arranged in front of said wall to swing into and out of the way through said wall, and having a swinging member eccentrically connected with the roll to actuate the stacker, substantially as described.

81. In combination, a longitudinally-movable and a laterally-swinging lever, means actuating the same, a loosely-fulcrumed bent lever pivoted to said lever between its ends, and a presser-bar at one end pivoted to the inner end of said bent lever and at its opposite end joined to said first-mentioned lever by a link, substantially as described.

82. In a stacker, the combination of a lever at one end pivoted to the printing-roll and at its opposite end longitudinally slotted, an adjustable pin passing through said slot, and a presser-bar connected with and actuated by said lever, substantially as described.

83. A receiving-way into which the letters are discharged in an upright position, in combination with a stacking device having a letter-engaging portion movable into and out of the path of the letters entering the way, and controlling and actuating means therefor confining the letter-engaging portion to first engage the letter flatly or approximately across its flat side and push the same toward the outer end of the way and to gradually assume an inclined position and move transversely of and into the way and carry the letter laterally to aline the same, substantially as described.

84. In a mail-marking machine, the combination of a feedway, a receiving-way, an interposed printing-couple, a feeder to carry the letters from the feedway, a horizontally-movable stacker to move into and out of the front end of the receiving-way to pack the letters therein, the stacker and feeder connected eccentrically with and actuated and timed to move in proper sequence from a rotary part of the machine, such as a member of the printing-couple, substantially as described.

85. In a mail-marking machine, the combination of a feedway, a receiving-way, an interposed printing-couple, a reciprocating feeder to carry the letters from the feedway, a stacker to pack the letters in the receiving-way, and actuating connections from the stacker and feeder to and eccentrically connected with a shaft of said interposed printing-couple so that the feeder, printing-couple and stacker move together in the proper sequence, substantially as described.

86. In a mail-marking machine, the combination of a frame, feed and receiving ways thereon side by side and in approximately the same horizontal plane and both ending at their front ends in approximately the same vertical plane, an interposed printing-couple, a reciprocating feeder to carry the letters to the printing-couple, a horizontally-arranged stacker arranged in front of the receiving-way and movable into and out of the way and across the path of the letters entering the same and alining and packing the letters therein, substantially as described.

87. In a mail-marking machine, the combination of a feedway, an interposed printing-couple, a reciprocating feeder in front of the feedway, a horizontally-disposed stacker in front of and movable into and out of the receiving-way, the feeder and stacker connected with and actuated from the printing-roll shaft, substantially as described.

88. In a mail-marking machine, a horizontally-disposed receiving-way, horizontally-rotating printing and impression rolls discharging the letters into said way, and a horizontally-disposed stacker in front of said way moving in a horizontal plane above the plane of said rolls, and eccentrically connected with and actuated from a rotary member, substantially as described.

89. In a mail-marking machine, the combination of a horizontally-disposed receiving-way having a side guide and an opposite side inlet, a front wall inclined rearwardly and toward said guide, a pair of rolls discharging the letters through said inlet into and toward said guide of the way so that their front ends are directed rearwardly by the wall, and a horizontally-movable stacker arranged at and having a return stroke in front of the way and actuated and controlled to enter the front end of the way near said inlet after each letter has been discharged into the way and to press the letters inwardly and also to engage their rear portions and press them toward said guide and leaving the way through the opposite side of its front, the stacker entering and leaving the way through the front and between said guide and inlet, substantially as described.

90. In a mail-marking machine, the combination of a letter-way having a side guide, means to discharge the letters into the way in an upright position, feeding means to carry the body of the letters outwardly in the way and maintain them loosely together, and a horizontally-swinging stacker having a return stroke in front of the way and actuated and controlled to enter the way near one side of its front and move into and across the way after each letter has entered the way, and to leave the way at the opposite side of its front end, substantially as described.

91. In a mail-marking machine, the combination of a receiving-way having a side inlet at its front, a wall in front of said inlet inclined rearwardly and toward the opposite side of the way, and a stacker having an encircling path of movement and operated and controlled to pass into and out of the front end of the way and move transversely of the way over its floor, the letter-engaging portion of the stacker while in the way shifting or varying its position or angle relative to the way and to its position during other portions of its path of movement, substantially as described.

92. In a mail-marking machine, the combination of a horizontally-disposed receiving-way having a side inlet and an opposite side guide, a pair of rolls at said inlet, a horizontal floor on which the lower edges of the letters travel from the rolls across the front end of the way, a rigid wall extending across the front end of the way from the inlet to said guide and inclined rearwardly and toward the guide, a horizontally-disposed stacker operated and controlled to move through the wall into the way near the inlet, and after each letter has been discharged into the way with its front end thrown rearwardly by said wall so that its rear end is engaged by the stacker which then moves transverse of the way pushing the letter toward said guide and rearwardly and leaving the way near the opposite end of the wall, the stroke of the stacker in the way being shorter than the width of the way, substantially as described.

93. In a mail-marking machine, the combination of a horizontally-disposed receiving-way, a pair of rolls to discharge the separate pieces thereinto in an upright position onto the floor of the way, a swinging stacker having its letter-engaging portion arranged above the floor of the way to move into and out of the front end and above the floor of the way, in an encircling path, crank or eccentric actuating means, and a swinging controlling link or member causing the letter-engaging portion of the stacker during its stroke to shift its position or angle relative to the way and the plane in which the pieces move into the way, substantially as described.

In testimony that I claim the foregoing as my own I affix my signature in presence of two witnesses.

WILLIAM BARRY.

Witnesses:
C. M. WERLÉ,
HUBERT E. PECK.